United States Patent [19]

Date et al.

[11] Patent Number: 5,023,723
[45] Date of Patent: Jun. 11, 1991

[54] IMAGE SENSING APPARATUS HAVING PLURAL IMAGE SENSORS AND PLURAL SHUTTERS

[75] Inventors: Nobuaki Date, Kawasaki; Syuichiro Saito, Yokohama, both of Japan

[73] Assignee: Canon Kabushiki Kaisha, Tokyo, Japan

[21] Appl. No.: 336,707

[22] Filed: Apr. 12, 1989

[30] Foreign Application Priority Data

Apr. 18, 1988 [JP] Japan .............................. 63-093580
Apr. 18, 1988 [JP] Japan .............................. 63-093581
Apr. 18, 1988 [JP] Japan .............................. 63-093582

[51] Int. Cl.⁵ .............................................. H04N 9/00
[52] U.S. Cl. ................................ 358/225; 354/476; 354/407; 358/43; 358/213.19
[58] Field of Search ............ 354/407, 424, 264, 246, 354/242, 429, 432, 434, 138, 130, 133, 140, 147, 481, 103, 104, 483, 478, 476, 154; 358/226, 225, 213.13, 213.19, 43, 50, 52

[56] References Cited

U.S. PATENT DOCUMENTS

| | | | |
|---|---|---|---|
| 3,548,083 | 12/1970 | Cahen | 358/52 |
| 3,977,012 | 8/1976 | Erlichman | 354/437 |
| 4,162,831 | 7/1979 | Gold | 354/432 |
| 4,175,843 | 11/1979 | Douglas | 354/429 |
| 4,491,406 | 1/1985 | Johnson | 354/429 |
| 4,682,873 | 9/1989 | Yajima et al. | 350/96.26 |

FOREIGN PATENT DOCUMENTS 0044863  3/1983  Japan .............................. 358/50
1051065  12/1966  United Kingdom ................ 358/50

Primary Examiner—Joseph A. Orsino
Assistant Examiner—Jill Jackson
Attorney, Agent, or Firm—Robin, Blecker, Daley & Driscoll

[57] ABSTRACT

An image sensing apparatus is arranged to have the image of one and the same object received by a plurality of image sensing devices through shutters discretely arranged in pairs with these image sensing devices respectively. The apparatus is provided with a synchronizing circuit for synchronizing exposure timings of these shutters.

36 Claims, 9 Drawing Sheets

IMAGE SENSING APPARATUS HAVING PLURAL IMAGE SENSORS AND PLURAL SHUTTERS

BACKGROUND OF THE INVENTION

1. Field of the Invention

This invention relates to an image sensing apparatus having a plurality of image sensing devices.

2. Description of the Related Art

In order to enhance the resolution of an image produced by an image sensing apparatus, particularly an electronic camera such as a still video camera or the like, it is essential to increase the number of picture elements of the image sensing device of the apparatus. However, the increasable number of picture elements is limited in a case where the apparatus is the so-called single-plate or single-tube type camera using a single image sensing device which is a solid-state image sensor such as a CCD (charge-coupled device) or a camera tube. In view of this limit, it is conceivable to enhance the resolution by using a camera which has a plurality of image sensors and is called a multi-plate or multi-tube type camera.

Meanwhile, there has recently appeared a still video camera of the kind having a mechanical shutter arranged for taking a picture of a moving object.

However, the shutter of the camera of this kind has been arranged within an optical path obtained before a photographing light flux is split for each of the image sensing devices. The conventional arrangement thus allows the camera to use a single shutter. However, an optical path between the shutter and each of the image sensors becomes long because of the arrangement. The long optical path makes use of a slit shutter difficult. Therefore, the shutter cannot be set at a high speed. The shutter thus tends to give the so-called shutter blur for a quick moving object. Besides, it might cause some color deviation in the image output of the camera.

SUMMARY OF THE INVENTION

The present invention is directed to the solution of the above-stated problems of the prior art. It is therefore an object of the invention to provide an image sensing apparatus of the above-stated kind which is capable of operating at a high shutter speed without causing shutter blurring even for a quick moving object and produces an image having no color deviation.

It is another object of the invention to provide a shutter control mechanism ensuring no color deviation of an image due to a discrepancy in exposure timing between the shutters of a plurality of image sensing devices.

It is a further object of the invention to provide an image sensing apparatus wherein a flashing operation is arranged to be performed when all the focal plane shutters of the apparatus are opened even in cases where the shutters do not uniformly open and close.

To attain the above-stated object, an embodiment of this invention is arranged as follows: Shutters are disposed in front of a plurality of image sensing devices in their incident optical paths; and the shutter elements of these shutters are arranged to travel in the same direction relative to object's images to be formed on these image sensing devices.

With the shutters of the embodiment arranged in this manner, each of the image sensing devices can be arranged to have a short optical path length. Therefore, each of the shutters can be set at a high shutter speed. Further, since the shutters are arranged to travel in the same direction relative to the object's image, the lengths of exposure time for the picture elements of the image sensors (or image sensing devices) become substantially unvarying, so that the color deviation, etc. mentioned in the foregoing can be prevented.

Further, another embodiment of the invention is provided with exposure timing adjustment means for causing shutters which are disposed in front of a plurality of image sensing devices in their optical paths to be exposed at the same timing.

The above-stated arrangement enables the embodiment to prevent the color deviation, etc. of the image duet to the exposure timing deviation of the picture elements of the image sensing devices even in taking a picture of a quick moving object.

To attain the above-stated object, an image sensing apparatus arranged according to this invention as an embodiment thereof comprises: a plurality of image sensors arranged to receive optical images of one and the same object to be photographed; a plurality of focal plane shutters disposed respectively in front of the plurality of image sensors, each of the plurality of focal plane shutters having leading and trailing blades; a plurality of leading blade travel completion detecting means and a plurality of trailing blade travel start detecting means both of which are disposed at the plurality of focal plane shutters respectively; and flashing control means for generating a flashing start signal on the basis of a logical product signal obtained from outputs of the plurality of leading blade travel completion detecting means and for generating a flashing stop signal on the basis of a logical sum signal obtained from outputs of the plurality of trailing blade travel start detecting means.

With the embodiment arranged in this manner, the flashing start signal is obtained after completion of the travel of all the leading blades of the plurality of focal plane shutters. The flashing stop signal is obtained when even one of the trailing blades of the focal plane shutters begins to travel. This enables the embodiment to have a flash unit which emits flash when all the shutters are open.

Other s and features of the invention will become apparent from the following detailed description of embodiments thereof taken in connection with the accompanying drawings.

DETAILED DESCRIPTION OF THE PREFERRED EMBODIMENTS

Figure 1:
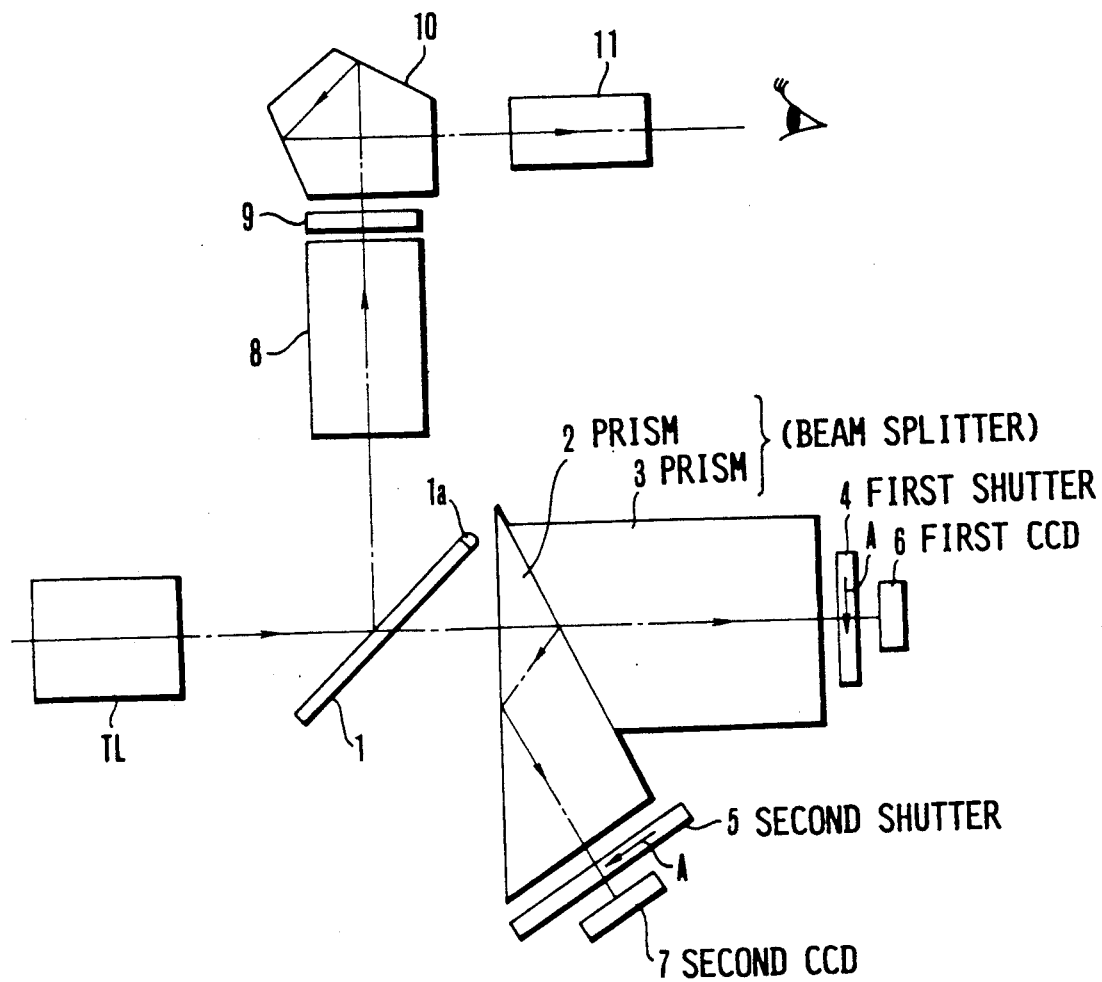
FIG. 1 shows by way of example the arrangement of the optical system of a two-plate type camera which is arranged as a first embodiment of the invention.

FIG. 1 shows the optical system arrangement of a two-plate type camera which is arranged according to this invention as a first embodiment thereof. The illustration includes a photo-taking lens TL; and a total-reflection quick-return mirror 1. When a release switch which is not shown is operated, an optical path change-over action is performed by raising the quick-return mirror 1 clockwise around a fulcrum 1a from its position on the side of a viewfinder optical system to its position on the side of a photographing optical system. Prisms 2 and 3 jointly form a beam splitter which is arranged to split a photographing light flux. Reference numerals 4 and 5 denote first and second shutters. Numerals 6 and 7 denote first and second solid-state image sensors which are CCDs or the like and are arranged as two image sensing devices. One of or both of these image sensors may be camera tubes instead of solid-state image sensors. The shutters 4 and 5 are disposed in front of the light flux incident on the CCDs 6 and 7 and in rear of the prisms 2 and 3, respectively.

The illustration further includes a prism 8; a focusing screen 9; a pentagonal roof type prism 10; and an eyepiece lens 11. The incident light which comes through the photo-taking lens TL is selectively directed either to the viewfinder optical system or to the photographing optical system through the turning movement of the quick-return mirror 1 around the fulcrum 1a thereof. The viewfinder optical system is arranged to convert an image formed on the focusing screen 9 into a non-reverse erecting image by means of the pentagonal roof type prism 10 and to enlarge it by means of the eyepiece lens 11 for sighting.

The photographing optical system is arranged to split the incident light flux by means of the beam splitter which consists of the prisms 2 and 3 and to guide the split light fluxes to the first and second CCDs 6 and 7. The first and second shutters 4 and 5 which are, for example, focal plane shutters or the like are disposed just before the CCDs 6 and 7, respectively. In the case of this specific embodiment, the first CCD 6 is arranged to obtain a luminance signal and the second CCD 7 to obtain a color signal. This arrangement, however, may be changed, for example, to use the first CCD 6 for detecting a green color and the second CCD 7 for detecting red and blue colors.

Figure 2:
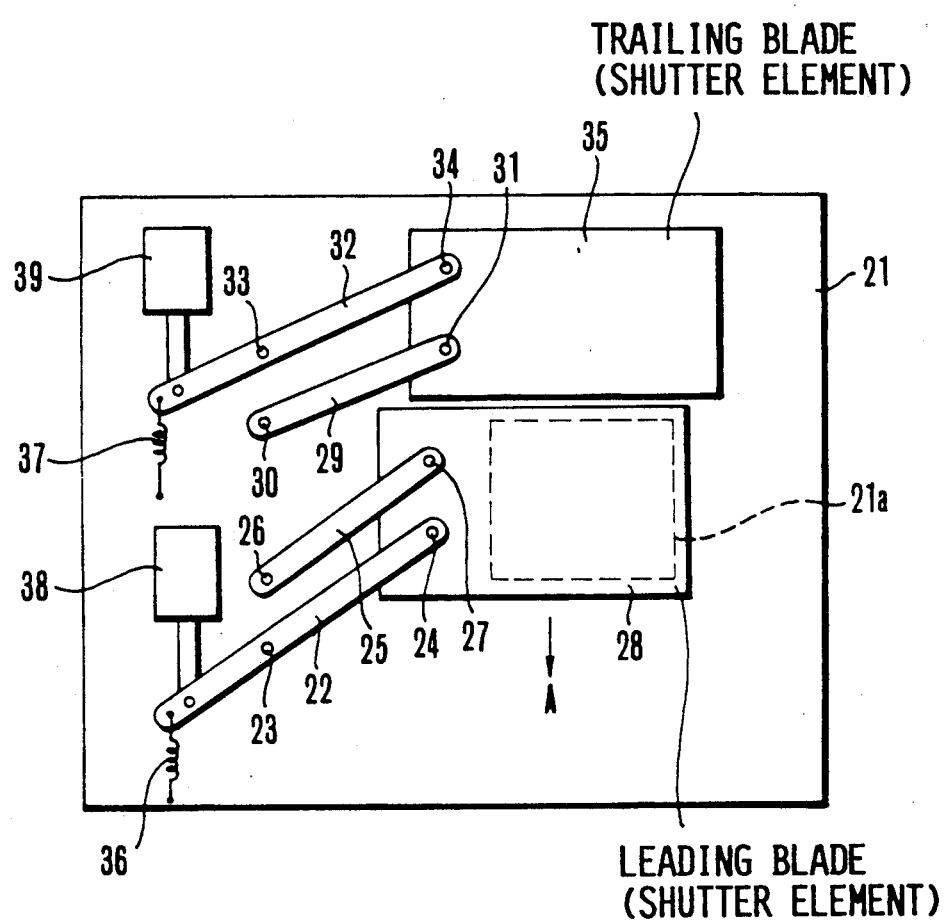
FIG. 2 schematically shows by way of example the shutter arrangement of the first embodiment.

FIG. 2 schematically shows by way of example the arrangement of each of the shutters. A known mechanism is shown in FIG. 2. Referring to FIG. 2, a base plate 21 is provided with an aperture 21a. An arm 22 has one end thereof rotatably attached to the base plate 21 by a pin 23. Another pin 24 rotatably attaches the other end of the arm 22 to a leading blade 28 which serves as a shutter element. Another arm 25 has its one end rotatably attached to the base plate 21 by a pin 26 and the other end to the leading blade 28 by a pin 27. These arms 22 and 25 and pins 23, 24, 26 and 27 form a parallelogrammic linkage. A trailing blade 35 which serves as another shutter element is arranged to form another parallelogramic linkage in conjunction with arms 29 and 32 and pins 30, 31, 33 and 34 in a manner similar to the leading blade 28.

A return spring 36 has its one end attached to the arm 22 and the other end to the base plate 21. Another return spring 37 has its one end attached to the arm 32 and the other end to the base plate 21. A plunger 38 is connected to the arm 22 in such a manner that, when energized, it causes the arm 22 to turn clockwise around the pin 23. A plunger 39 which is similar to the plunger 38 is connected to the arm 32 and is arranged to cause the arm 32 to turn clockwise around the pin 33 when it is energized.

The shutters which are respectively arranged in the above-stated manner are disposed in front of the first and second CCDs 6 and 7 in their incident light flux paths. In FIG. 1, these shutters are indicated by reference numerals 4 and 5. The traveling direction of the leading and trailing blades 28 and 35 are respectively indicated by arrows A. The optical images incident on the CCDs 6 and 7 are formed in the same direction. Therefore, the shutters 4 and 5 travel in the same direction relative to the images.

Figure 3:
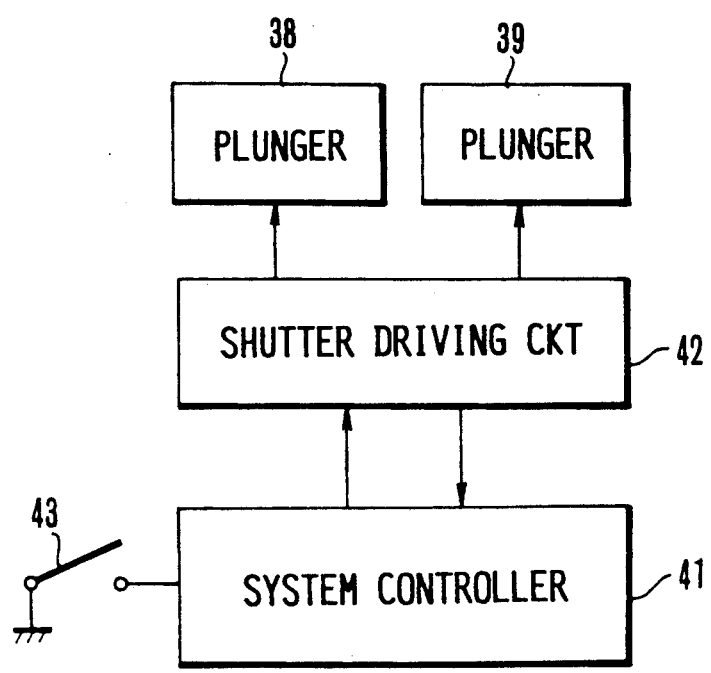
FIG. 3 is a block diagram showing a shutter control circuit of the first embodiment.

FIG. 3 shows in a block diagram the arrangement of a circuit provided for driving each of these shutters. Referring to FIG. 3, the illustration includes a system controller 41; a shutter driving circuit 42; and a shutter release switch 43.

Each of the shutters operates as follows: When the shutter release switch 43 is closed in response to a shutter release operation, the plungers 38 and 39 are energized by the system controller 41 and the shutter driving circuit 42 at a predetermined time interval corresponding to a shutter speed selected. When the plunger 38 is first energized, the arm 22 turns clockwise as viewed on FIG. 2 against the force of the spring 36. This causes the leading blade 28 to move downward (in the direction of arrow A) virtually in parallel. The aperture 21a is uncovered to initiate an exposure. When the other plunger 39 is energized next, the trailing blade 35 likewise moves downward (in the direction of arrow A) virtually in parallel. This covers the aperture 21a to terminate the exposure. After the end of the exposure, the current supply to each of the plungers 38 and 39 is cut off. The leading and trailing blades 28 and 35 are then brought back to their initial positions by the return springs 36 and 37.

As mentioned in the foregoing, the picture elements of each of the CCDs 6 and 7 are not simultaneously exposed. They are exposed at different points of time defined by the shutter blades 28 and 35. This presents no problem if the camera has only a single image sensor. However, in the case of a camera using a plurality of image sensors like this embodiment, the corresponding picture elements of the different image sensors must be exposed at the same point of time. If not, different images would be formed on the corresponding picture elements to bring about a problem such as color deviation or discrepancy or the like.

To avoid the above-stated inconvenience, the embodiment of this invention is arranged to cause the leading and trailing blades 28 and 35 of the first and second shutters 4 and 5 to travel in the same direction relative to the object's images formed on the CCDs 6 and 7 (in the direction of arrows A of FIGS. 1 and 2). In other words, the arrangement to have the shutters disposed in front of the plurality of image sensors in the paths of their incident light fluxes enables the embodiment to take the picture of even a quickly moving object without any shutter blur. Further, the arrangement to cause the shutter elements (or blades) of both the shutters to travel in the same direction relative to the object's image formed on the image sensors enables the embodiment to give an image of a high degree of quality having no color deviation.

Figure 4:
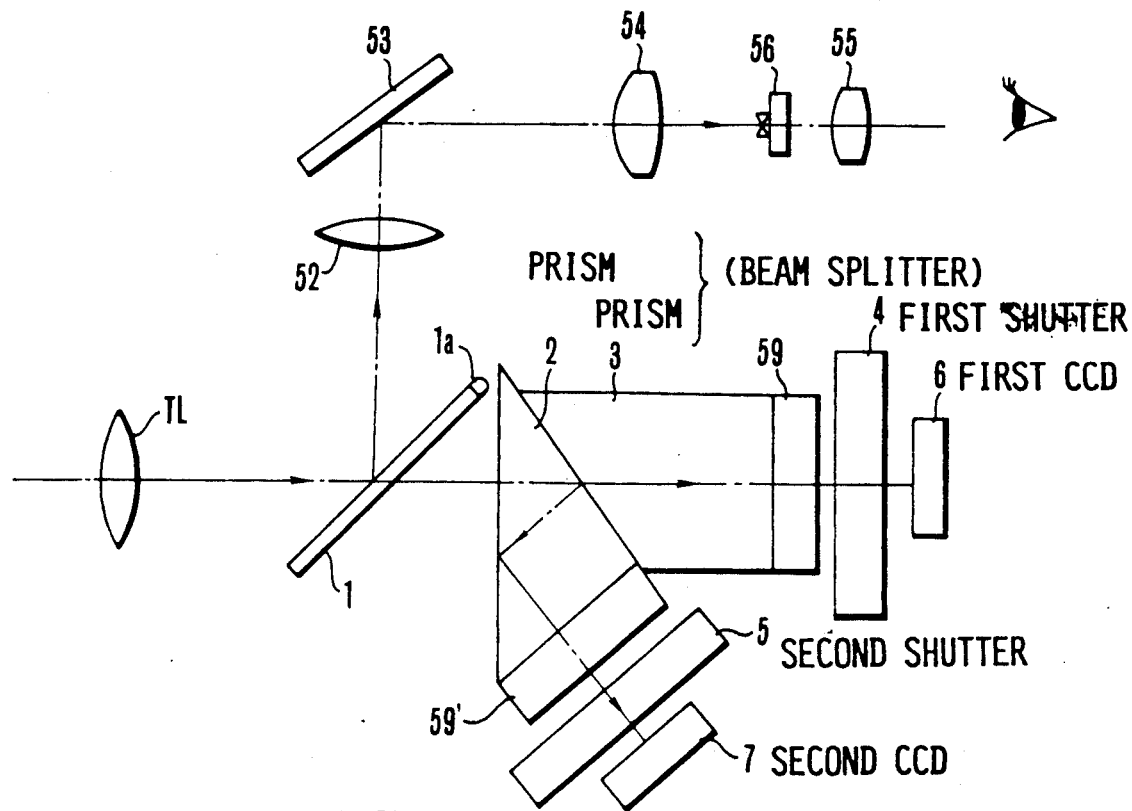
FIG. 4 shows by way of example the arrangement of the optical system of a two-plate type camera which is arranged as a second embodiment of the invention.

It is well known that the focal plane shutter is arranged to make a slit travel exposure when the shutter speed is within the range of high shutter speeds. Therefore, with the shutters disposed in front of the two image sensors like in the case of this embodiment, a discrepancy in the slit travel timing between the shutters brings about some difference between the images formed on the two image sensors according to the moving speed of the object, particularly in the event of a quickly moving object. Then, this difference causes the color deviation or the like of the image output of the camera and thus results in a lowered image quality. A second embodiment of this invention is arranged to solve this problem as described below:

FIG. 4 shows the optical system arrangement of a two-plate type camera arranged according to this invention as the second embodiment. In FIG. 4, the same component parts as those of FIGS. 1 and 2 are indicated by the same reference numerals. Reference numerals 52, 54 and 55 denote lenses for the viewfinder optical system. Of these lenses, the lens 55 serves as an eyepiece lens. The illustration further includes a total-reflection mirror 53; a focusing screen 56; and low-pass filters 59 and 59'.

Figure 5:
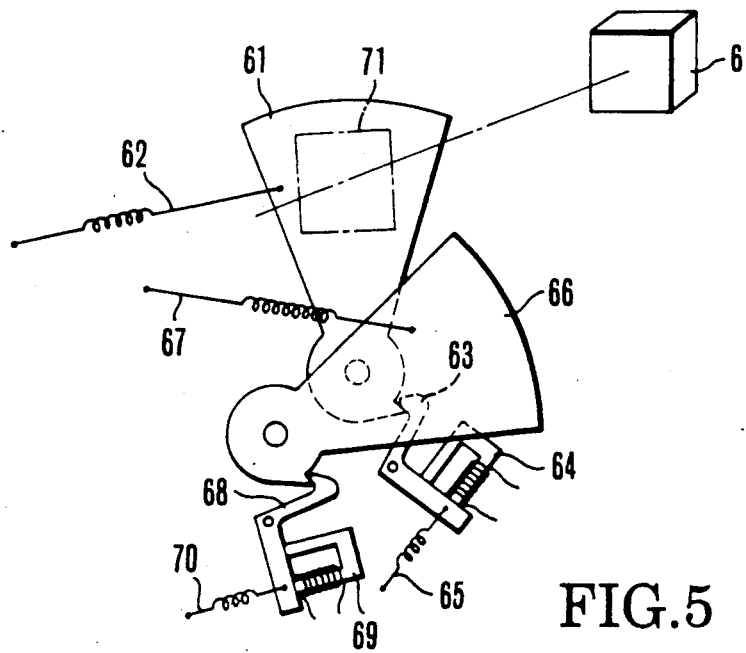
FIG. 5 shows the shutter mechanism of the second embodiment.

FIG. 5 shows by way of example the arrangement of the first shutter 4 of the second embodiment in outline. The first and second shutters 4 and 5 have their mechanisms arranged in the same manner. Referring to FIG. 5, the shutter includes a leading blade 61 and a trailing blade 66. The leading blade 61 is provided with a leading blade spring 62, a leading blade arresting hook 63, a leading blade magnet 64 and a leading blade magnet spring 65. The trailing blade 66 is arranged in a manner similar to the leading blade 61 and is provided with a trailing blade spring 67, a trailing blade arresting hook 68, a trailing blade magnet 69 and a trailing blade magnet spring 70.

In FIG. 5, the shutter is shown as in a state in which the leading and trailing blades 61 and 66 are charged (set in their charged positions) by a shutter charge mechanism which is not shown. The leading blade 61 covers an optical path 71 of the first CCD (image sensor) 6 which corresponds to an aperture. When a power supply to the leading magnet 64 is released in response to a shutter release operation, the leading magnet spring 65 causes the leading blade arresting hook 63 to turn clockwise to unlock the leading blade 61. The leading blade 61 is then turned counterclockwise by the leading blade spring 62 to begin to expose the first CCD 6 by unblocking the optical path 71.

After the lapse of a period of time corresponding to a set shutter speed, a power supply to the trailing blade magnet 69 is released. The trailing blade arresting hook 68 is caused to turn clockwise by the trailing blade magnet spring 70 to unlock the trailing blade 66. The trailing blade spring 67 then causes the trailing blade 66 to turn counterclockwise to block the optical path 71 and to terminate the exposure action on the first CCD 6.

In a case where the shutter is arranged to perform a slit traveling action at a high speed, the picture of a moving object cannot be adequately taken if there arises a discrepancy in exposure timing between the first and second shutters 4 and 5 as mentioned in the foregoing. In other words, the discrepancy in exposure timing brings about discrepancy in position between an image formed on the first CCD 6 and an image formed on the second CCD 7. This results in an image color deviation which affects the image output of the camera. To solve this problem, the shutter control circuit 74 of the second embodiment is provided with an adjustment timer 79 which is arranged to serve as synchronizing means for eliminating any discrepancy in exposure timing between the first and second shutters 4 and 5, as shown in FIG. 6.

Figure 6:
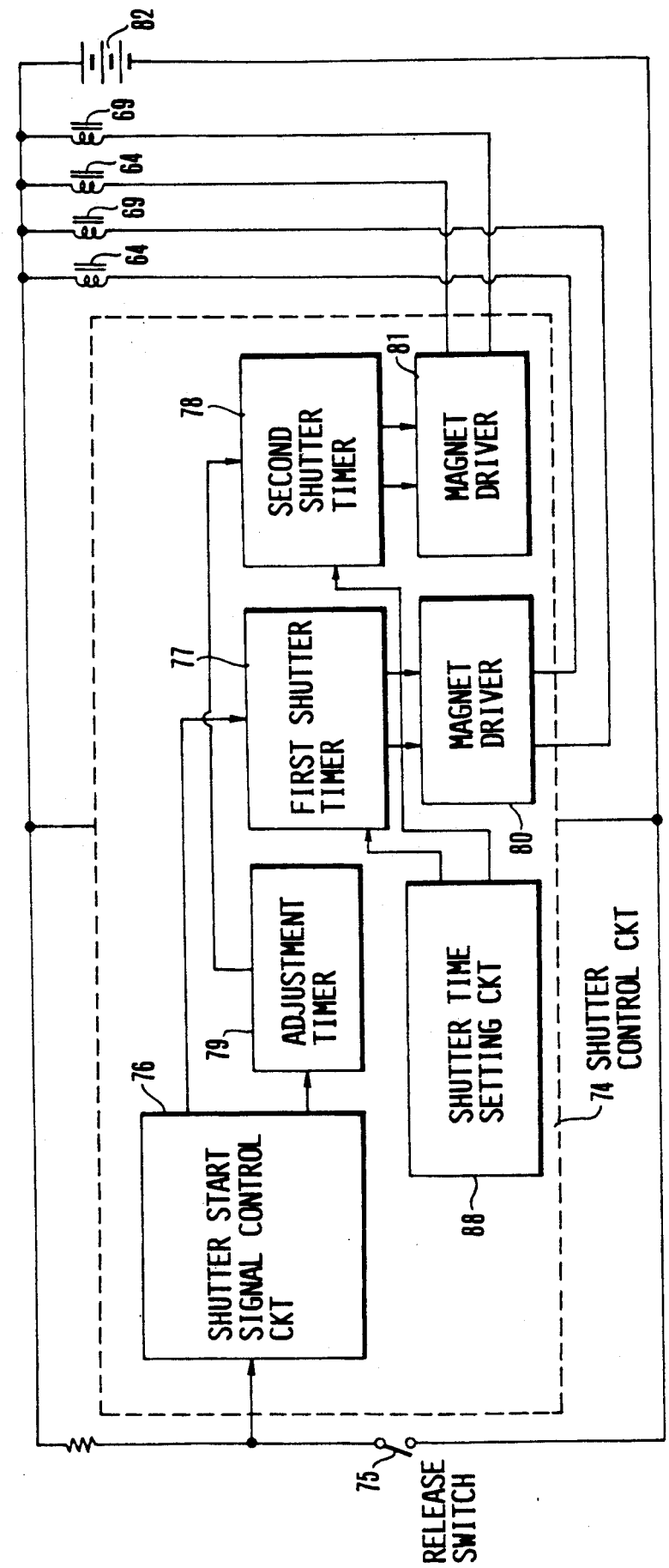
FIG. 6 is a block diagram showing a shutter control circuit of the second embodiment.

FIG. 6 shows the circuit arrangement of the second embodiment including the above-stated shutter control circuit 74. When a release switch 75 is turned on, a shutter start signal control circuit 76 supplies shutter start signals to a first shutter timer 77 and a second shutter timer 78 after the lapse of a given period of time determined by taking into consideration a length of time required for aperture adjustment and a raising (springing-up) action on the quick-return mirror 1. Then, in synchronism with this shutter start signal, the first and second shutter timers 77 and 78 produce signals for turning on the magnets 64 respectively. Then, after the lapse of a length of time set by a shutter time setting circuit 88, the timers 77 and 78 produce signals for turning on the magnets 69 respectively. The shutter start signal to be supplied from the shutter start signal control circuit 76 to the second shutter timer 78 is supplied to the latter via an adjustment timer 79 which is provided for the purpose of synchronizing the exposure timing of the second shutter timer 78 with that of the first shutter timer 77.

The first and second shutter timers 77 and 78 are arranged to actuate the leading blade magnets 64 shown in FIG. 5 via applicable magnet drivers 80 and 81, respectively. The magnet actuating points of time of the two shutters 4 and 5 can be synchronized (equalized) with each other by adjusting the starting points of time of the first and second shutter timers 77 and 78 by means of the above-stated adjustment timer 79.

It may appear, from FIG. 6, that the start of the second shutter 5 is delayed and takes place later than that of the first shutter 4 by a length of time required for the operation of the adjustment timer 79. However, in actuality, the shutter start signal control circuit 76 is arranged to have the signal for the second shutter 5 produced earlier than the signal for the first shutter 4 and supplied to the adjustment timer 79. Such being the arrangement, the start timing adjustment between the two shutters 4 and 5 can be carried out both in positive and negative directions. Further, as regards the synchronizing means to be used for this purpose, any circuit element that has a delaying function can be employed as the synchronizing means.

In the case of the embodiment described, this invention is applied to a still video camera having two image sensors. The principle of the invention is, however, of course applicable to any camera of the kind having more than two image sensors. For example, the invention is applicable also to such a camera that is arranged to have three image sensors for obtaining image signals of three colors R (red), G (green) and B (blue) and to separate colors by means of dichroic mirrors.

Further, while the invention is applied to the multi-plate type camera wherein a plurality of solid-state image sensors such as CCDs or the like are used as the image sensing devices, the advantageous effect of the invention is of course likewise attainable by applying it to a camera of the multi-tube type wherein camera tubes are employed as the image sensing devices.

With a plurality of shutters arranged respectively in combination with a plurality of image sensing devices to be started independently of each other, the second embodiment is arranged to cause the exposure effecting points of time of these shutters to coincide with each other as described in the foregoing. The arrangement enables the second embodiment to enhance the quality of image output thereof by preventing any color deviation or the like from occurring in shooting a moving object.

In carrying out a flash photographing operation with a camera of the kind having a focal plane shutter, a flash unit must be allowed to emit flash when the shutter is fully opened. In the case of a multi-plate type still video camera like the embodiment described, the flash unit must be arranged to emit flash when all the shutters are open. However, a plurality of focal plane shutters cannot be opened and closed in exactly the same manner. The fully opening point of time of one shutter tends to differ from that of another shutter. Third and fourth embodiments of this invention which are shown in FIGS. 7 to 9 are arranged to be capable of solving this problem.

Figure 7:
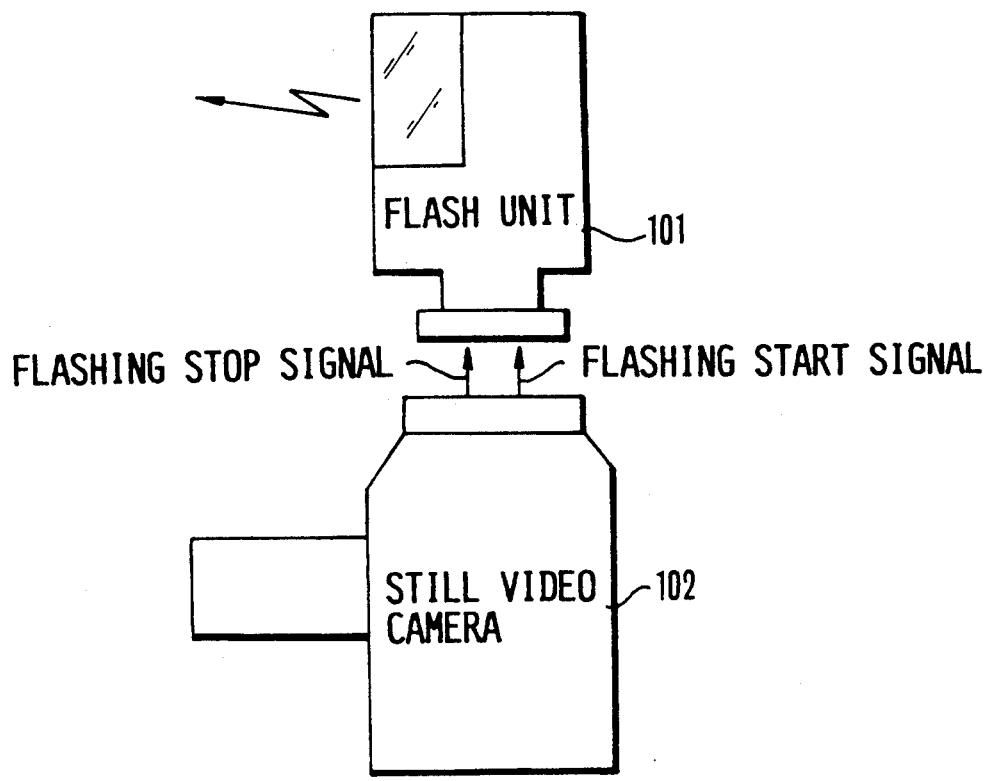
FIG. 7 shows the concept of third and fourth embodiments of the invention.

FIG. 7 shows the concept of the third embodiment. FIG. 8 shows the mechanism of the essential parts of a two-plate type still video camera which is arranged as the third embodiment of the invention. FIG. 9 is a circuit diagram of the third embodiment. In these drawings, the same parts as those of FIGS. 1 to 6 are indicated by the same reference numerals.

Referring to FIG. 7, a reference numeral 101 denotes a flash unit, and a numeral 102 a still video camera. The flash unit 101 is arranged to begin to emit flash in response to a flashing start signal output from the camera 102 and to stop flashing in response to a flashing stop signal output from the camera. While the flash unit 101 is illustrated as arranged discretely from the camera, it can be arranged in the same manner in a case where the camera incorporates it therein.

Figure 8:
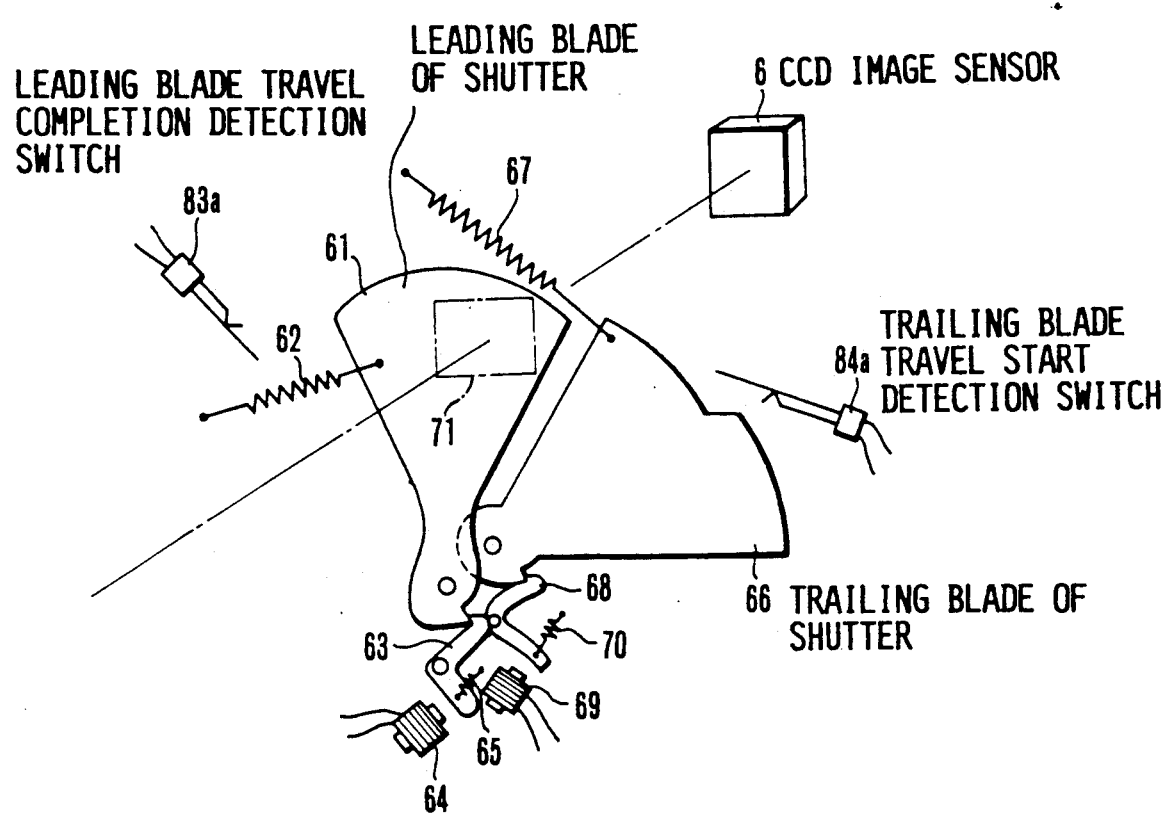
FIG. 8 shows the arrangement of the essential parts of the third embodiment.
Figure 9:
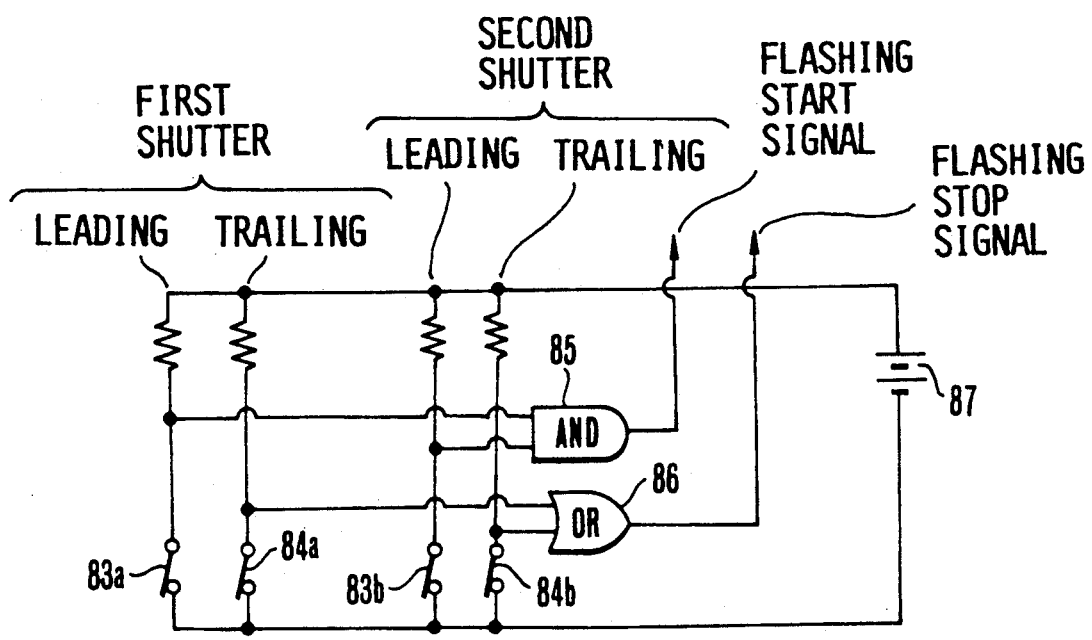
FIG. 9 is a circuit diagram showing the circuit arrangement of the third embodiment.

FIG. 8 shows the arrangement of each of a pair of focal plane shutters together with a corresponding image sensor part. The third embodiment differs from the second embodiment shown in FIG. 5 in the following point: The third embodiment is provided with a leading blade travel completion detection switch 83a and a trailing blade travel start detection switch 84a. Further, the magnets 64 and 69 are arranged to normally stay away from hooks 63 and 68 respectively. The springs 65 and 70 are arranged to urge these hooks in the direction opposite to the urging direction of the arrangement shown in FIG. 5. Further, in FIG. 8, the shutter is shown as in a state of being charged by a charging mechanism which is not shown.

When a current is supplied to the leading blade magnet 64, the magnet 64 attracts the hook 63 to unlock the leading blade 61. This allows the leading blade 61 to turn counterclockwise by a spring 62. An aperture 71 is uncovered by this. Immediately after the leading blade 61 has moved completely to the outside of the aperture 71, the leading blade 61 comes in touch with the leading blade travel completion detection switch 83a to turn the latter off.

Next, when a current is supplied to the trailing blade magnet 69 after the lapse of a given period of time, the magnet 69 attracts the hook 68 to unlock the latter. A spring 67 then causes the trailing blade 66 to cover the aperture 71 by turning counterclockwise. Immediately before the trailing blade 66 enters the aperture 71, the trailing blade 66 comes in touch with the trailing blade travel start detection switch 84a to turn it off.

The third embodiment is provided with two focal plane shutters which are respectively combined with two image sensors in two pairs and are arranged in the manner as described above.

FIG. 9 shows the third embodiment in a circuit diagram. A leading blade travel completion detection switch 83a is arranged to detect completion of the travel of the leading blade of a first focal plane shutter (or a first shutter) 83. A trailing blade travel start detection switch 84a is arranged to detect commencement of the travel of the trailing shutter blade of the first shutter. A leading blade travel completion detection switch 83b is arranged to detect completion of the travel of the leading blade of a second (focal plane) shutter. A trailing blade travel start detection switch 84b is arranged to detect commencement of the travel of the trailing blade of the second shutter. These switches 83a, 83b, 84a and 84b are arranged such that, when they are opened, the input levels of an AND gate 85 and an OR gate 86 which are connected to these switches change from low levels to high levels respectively.

Therefore, when the switches 83a and 83b open upon completion of the travel of both the leading blades of the first and second shutters, the output level of the AND gate 85 becomes high to give a flashing start signal. When one of the two switches 84a and 84b opens upon commencement of the travel of the trailing blade of one of the first and second shutters, the output level of the OR gate 86 becomes high to give a flashing stop signal. A reference numeral 87 denotes a power source.

The above-stated arrangement enables the third embodiment to cause the flash unit 101 to emit flash with the apertures of both the first and second shutters fully opened irrespectively of any discrepancy in opening and closing actions between the two shutters.

Figure 10:
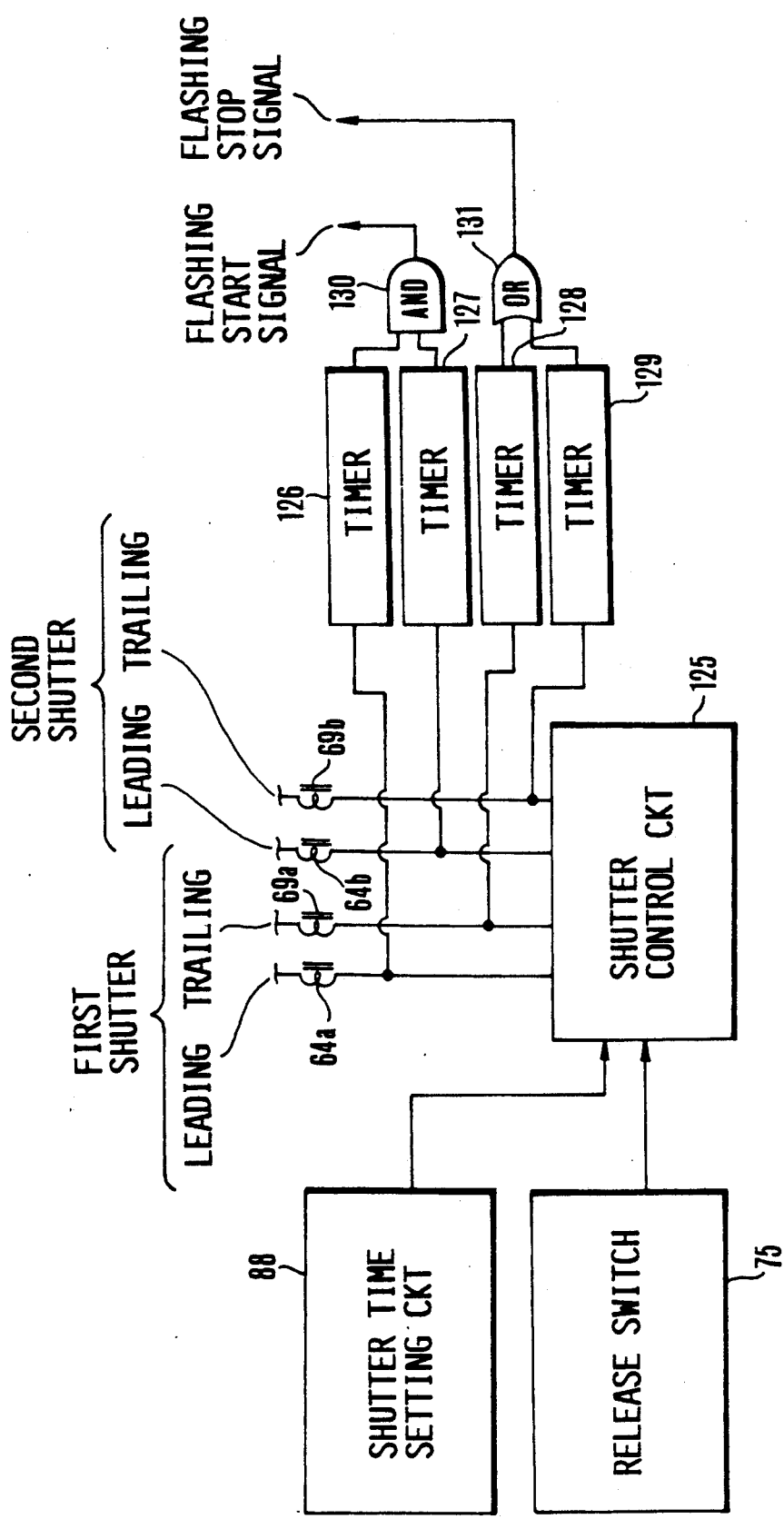
FIG. 10 is a circuit diagram showing the circuit arrangement of the fourth embodiment.

FIG. 10 is a circuit diagram showing a fourth embodiment of this invention. The mechanical arrangement of the fourth embodiment includes two pairs or combinations of focal plane shutters and image sensors excluding the mechanical switches of FIG. 8. Referring to FIG. 10, a suction type magnet 64a is arranged to unlock the leading blade of the focal plane shutter of the first shutter-and-image sensor pair, i.e. a first shutter. A suction type magnet 69a is arranged to unlock the trailing blade of the first shutter. A magnet 64b is arranged to unlock the leading blade of the focal plane shutter of the second shutter-and-image sensor pair, i.e. a second shutter. A magnet 69b is arranged to unlock the trailing blade of the second shutter.

The magnets 64a, 69a, 64b and 69b are arranged to be driven by a shutter control circuit 125. The input side of the magnet 64a is connected to one of the input terminals of an AND gate 130 via a timer 126. The input side of the magnet 64b is connected to the other input terminal of the AND gate 130 via a timer 127. The input side of the magnet 69a is connected to one of the input terminals of an OR gate 131 via a timer 128. The input side of the magnet 69b is connected to the other input terminal of the OR gate 131 via a timer 129.

With the circuit arranged in the above-stated manner, when a release switch 75 is started after the shutter time is set at a full open time value by a shutter time setting circuit 88, the shutter control circuit 125 supplies currents to the leading blade magnets 64a and 64b of the first and second shutters after completion of the operation of a mirror and that of an iris which are not shown.

Then the timers 126 and 127, which are arranged to measure a length of time corresponding to a period of time between commencement of a power supply to the leading blade magnets and the end of the travels of the leading blades begin to operate. Upon completion of the time measurement by these timers, the levels of both the inputs of the AND gate 130 become high. The output level of the AND gate 130 then becomes high to give the flashing start signal.

When a power supply is effected from the shutter control circuit 125 to the trailing blade magnets 69a and 69b, it actuates the timers 128 and 129 which are arranged to measure a length of time corresponding to a period of time between commencement of the power supply to the trailing blade magnet and entry of the trailing blade in the aperture.

Upon completion of the time measurement by any one of the timers 128 and 129, the level of one of the inputs of the OR gate 131 becomes high to give the flashing stop signal. To absorb any manufacturing unevenness existing between the first and second shutters, the above-stated four timers 126 to 129 are arranged to have their measuring time adjustable.

The above described arrangement enables the fourth embodiment to ensure that the flash unit emits flash only when the apertures of both the first and second shutters are fully opened irrespectively of any operation discrepancy between the two shutters.

While the invention is applied to the two-plate type still video cameras in the case of the embodiments described in the foregoing, the invention is likewise applicable to still video cameras of the type using three or more image sensors.

In the case of a still video camera having two or more focal plane shutters paired with image sensors, the arrangement of the third or fourth embodiment described enables the camera to cause a flash unit to emit flash accurately at a point of time when all the shutters are opened irrespectively of discrepancy in the operation timing among the shutters.

What is claimed is:

1. An image sensing apparatus comprising:
    a) a plurality of image sensing devices;
    b) a beam splitter for supplying the same image of an object to said plurality of image sensing devices; and
    c) a plurality of shutter means each of which is disposed between an exit face of said beam splitter and one of said plurality of image sensing devices.

2. An apparatus according to claim 1, wherein said plurality of shutter means are arranged to travel in the same direction relative to said same image of an object formed on each of said plurality of image sensing devices.

3. An apparatus according to claim 1, wherein said beam splitter includes a prism.

4. An apparatus according to claim 1, further comprising synchronizing means for causing said plurality of shutter means which are respectively disposed in front of said plurality of image sensing devices to perform opening and closing actions in synchronism with each other.

5. An apparatus according to claim 4, wherein said synchronizing means includes delaying means.

6. An apparatus according to claim 5, wherein said delaying means includes a timer.

7. An apparatus according to claim 1, further comprising detection means for detecting that all of said plurality of shutter means disposed in front of said plurality of image sensing devices are in a full open state.

8. An apparatus according to claim 7, further comprising flash means for emitting flash when said detection means has detected that all of said plurality of shutter means are in a full open state.

9. An apparatus according to claim 8, further comprising stopping means for stopping said flash means from emitting flash when said detection means has detected that one of said plurality of shutter means is no longer in a full open state.

10. An image sensing apparatus comprising:
    a) a plurality of image sensing devices;
    b) a beam splitter for causing the same image of an object to be supplied to and formed on said plurality of image sensing devices;
    c) a plurality of shutter means disposed respectively in front of said plurality of image sensing devices; and
    d) synchronizing means for synchronizing exposure timings of said plurality of shutter means.

11. An apparatus according to claim 10, wherein said plurality of shutter means are arranged to travel in the same direction relative to said same image of an object formed on each of said plurality of image sensing devices.

12. An apparatus according to claim 10, wherein said synchronizing means includes delaying means 13. An apparatus according to claim 12, wherein said delaying means includes a timer 14. An apparatus according to claim 10, further comprising detection means for detecting that all of said plurality of shutter means disposed in front of said plurality of image sensing devices are in a full open state.

15. An apparatus according to claim 14, further comprising flash means for emitting flash when said detection means has detected that all of said plurality of shutter means are in a full open state.

16. An apparatus according to claim 15, further comprising stopping means for stopping said flash means from emitting flash when said detection means has detected that one of said plurality of shutter means is no longer in a full open state.

17. An image sensing apparatus comprising:
    a) a plurality of image sensors arranged to receive the same image of an object to be photographed;
    b) a plurailty of focal plane shutters disposed respectively in front of said plurality of image sensors, each of said plurality of focal plane shutters havnig leading and trailing shutter blades;
    c) a plurailty of leading blade travel completion detecting means disposed respectively for said plurality of focal plane shutters;
    d) a plurality of trailing blade travel start detecting means disposed respectively for said plurality of focal plane shutters; and
    e) flashing control means for generating a flashing start signal on the basis of a logical product signal obtained from outputs of said plurality of leading blade travel completion detecting means and for generating a flashing stop signal on the basis of a logical sum signal obtained from outputs of said plurality of trailing blade travel start detecting means.

18. An apparatus according to claim 17, wherein said plurality of image sensors are arranged to receive images having different color conditions respectively.

19. An optical apparatus, comprising:

(a) means for defining a single optical path for conducting an image beam coming from an object;

(b) first optical means disposed on said optical path to conduct said image beam of the object into a plurality of optical paths; and (c) a plurality of second optical means disposed on said plurality of optical paths respectively to turn said optical paths ON and OFF.

20. An apparatus according to claim 19, wherein said first optical means includes a beam splitter.

21. An apparatus according to claim 19, wherein said second optical means includes a shutter means.

22. An apparatus according to claim 20 wherein the beam splitter includes a prism.

23. An apparatus according to claim 19 further including image sensing means and wherein said plurality of optical paths are arranged to conduct image beams therein to the image sensing means.

24. An apparatus according to claim 19, wherein the image beams conducted to said plurality of optical paths include the same object image.

25. An image sensing apparatus comprising a beam splitter; a plurality of image sensing means for receiving input radiation and outputting image information; means for irradiating said plurality of image sensing means with image beams each including the same object image obtained through said beam splitter; and shutter means disposed between said beam splitter and the respective image sensing means.

26. An apparatus according to claim 25, wherein said image information includes a color information and a luminance information.

27. An apparatus according to claim 25, wherein said image information includes color information concerning respective different colors.

28. An apparatus according to claim 27, wherein the different colors include R, G and B.

29. An apparatus according to claim 25, wherein said shutter means includes a plurality of shutters and wherein the respective ones of said shutters are arranged to be driven in synchronized state with each other to provide a common exposure timing for the plurality of image sensing means.

30. An image sensing apparatus, comprising:

a plurality of image sensing means receiving optical images coming from a same object;

a plurality of shutter means disposed respectively in front of the image sensing means;

light emitting means for emitting a light at a predetermined timing; and light emission control means for controlling said light emitting means so as to cause said light emitting means to emit light when all of said shutter means are fully opened.

31. An apparatus according to claim 30, wherein the plurality of image sensing means are arranged to provide a luminance information and a color information, respectively.

32. An apparatus according to claim 30, wherein the plurality of image sensing means are arranged to provide color informations of R, G and B, respectively.

33. An apparatus according to claim 30, wherein said light emitting means includes a flash lamp.

34. An image sensing apparatus, comprising:

(a) a plurality of image sensing means;

(b) a beam splitter for conducting an image beam coming from an object to respective ones of said image sensing means;

(c) a plurality of shutter means disposed between said beam splitter and the respective image sensing means; and (d) shutter control means for controlling opening and closing of the respective shutter means so that said plurality of image sensing means have a common exposure timing.

35. An apparatus according to claim 34, wherein said shutter control means includes delaying means.

36. An apparatus according to claim 35, wherein said delaying means includes a timer.

* * * * *